United States Patent [19]

Meyer et al.

[11] 3,882,684
[45] May 13, 1975

[54] TWO-COMPARTMENT CARTRIDGE ADAPTED FOR USE IN STRENGTHENING COAL OR STONE WALLS

[75] Inventors: Frank Meyer, Essen, Germany; Alfons Jankowski, Mauren, Liechtenstein; Otto-Ernst Glaesmann, Castrop-Rauxel; Gerhard Haake, Essen, both of Germany

[73] Assignee: Bergwerksverband GmbH, Essen, Germany

[22] Filed: Sept. 9, 1974

[21] Appl. No.: 504,538

[30] Foreign Application Priority Data
Sept. 12, 1973 Germany.......................... 2345913

[52] U.S. Cl................................................ 61/45 B
[51] Int. Cl............................................ E21d 20/02
[58] Field of Search....... 52/698; 61/35, 41 R, 45 B, 61/45 R

[56] References Cited
UNITED STATES PATENTS

| | | | |
|---|---|---|---|
| 3,324,663 | 6/1967 | McLean | 52/698 X |
| 3,403,520 | 10/1968 | Goodman | 61/45 R X |
| 3,618,326 | 11/1971 | Montgomery | 61/45 B |
| 3,698,196 | 10/1972 | Jankowski et al. | 61/45 B |
| 3,750,407 | 8/1973 | Heierli et al. | 61/45 R X |

*Primary Examiner*—Donald A. Griffin
*Attorney, Agent, or Firm*—Michael S. Striker

[57] ABSTRACT

A two-compartment pierceable cartridge adapted for reinforcing or strengthening a stone or coal wall by insertion into a hole that had been bored into the wall, one compartment of which contains a polyisocyanate of diphenylmethane, and the other compartment of which contains a mixture of a polyetherglycol having a hydroxyl number between 200 and 400, between 10 and 20 percent by weight of a plasticizer, and between 0.3 and 5.0 percent by weight of water. When the cartridge is broken up and its contents are mixed, a foamed polyurethane resin is formed in situ which plugs the bored hole and thereby reinforces the wall.

9 Claims, No Drawings

TWO-COMPARTMENT CARTRIDGE ADAPTED FOR USE IN STRENGTHENING COAL OR STONE WALLS

BACKGROUND OF THE INVENTION

Walls of coal and stone have heretofore been strengthened or reinforced by inserting into holes drilled therein to a depth of at least one meter or so, a mixture capable of forming a foamed or expanded synthetic resin therein which, after penetrating and hardening, reinforces the region about the bored hole. The synthetic resin can be compressed and forced into the bored hole under relatively high pressures since it is generally very highly fluid and thereby fill the cracks and crevices surrounding the bored hole even before the resin has expanded or foamed.

In a preferred specific embodiment of this reinforcing procedure that is described in U.S. Pat. No. 3,698,196 the synthetic resin is introduced into the bored hole in the form of a two-component cartridge which is then broken open therein with a pole, for example, a wooden pole, so that its contents can flow and be intimately mixed together. This variation of the process is especially suitable for reinforcing crumbling coal and stone walls in mines.

SUMMARY OF THE INVENTION

The two-compartment cartridge of the present invention consists in general of a wall forming an outer compartment containing a mixture of a polyetherglycol, plasticizer, and water, which wall encloses another wall forming a second compartment having a smaller diameter containing a polyisocyanate of diphenylmethane that is capable of reacting with polyetherglycol to form a foamed or expanded polyurethane resin. The walls of this cartridge are generally formed of films of sheet materials.

It has been found that expanded or foamed polyurethane resins for this purpose must have certain physical characteristics that are not possessed by diisocyanates of aromatic hydrocarbons that are normally used in producing such foamed polyurethane resins. For example, tolylene diisocyanate [bis (carbonylamino)toluene], which is a common diisocyanate that is used in producing such resins, has a relatively low flash point and accordingly a high vapor pressure. Because it also has a highly detrimental effect on health, prior processes for reinforcing such walls in which it was used to produce the required polyurethane resin had not achieved extensive commercial success.

DETAILED DESCRIPTION AND PREFERRED EMBODIMENTS OF THE INVENTION

It has now been discovered that the disadvantages of bis(carbonylamino)toluene for use in reinforcing stone and coal walls can be obviated and foamed urethane resinous bodies can be produced which possess desirable elasticity when the diisocyanate component in one of the two compartments of the cartridge is the diisocyanate of diphenylmethane [4,4'-bis(carbonylamino)diphenylmethane] having the formula

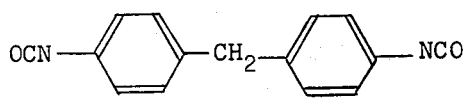

and the other compartment contains a mixture consisting of a polyetherglycol having a hydroxyl number between 200 and 400, between 10 and 20 parts by weight of a plasticizer, and between 0.2 and 5.0 percent by weight of water. 4,4'-Bis (carbonylamino)diphenylmethane has a very high flash point which is in excess of 200°C and a vapor pressure of only $1 \times 10^{-4}$ torr at 20°C. It is much less detrimental to the skin than is bis(carbonylamino)toluene. Furthermore, it can be mixed advantageously with up to 30 percent by weight of triisocyanates, tetraisocyanates and higher polyisocyanates of diphenylmethane, such as, for example 2,2', 4,4'-tetra(carbonylamino)diphenylmethane or other polyisocanates of aromatic hydrocarbons.

Polyetherglycols which react with the polyisocyanates of diphenylmethane to produce polyurethane resins which may be used in the preparation of the cartridges of the present invention include those polyetherglycols, which are produced by reaction between trimethylolpropan and propyleneoxid, this product having an oH-number of 320-370, an average molecular weight of about 150 and a viscosity of about 700 mPa s/25°C, (Milli-pascal-seconds) in the following example 1 called compound X or by reaction between sacharose and 1,2 Propandiol, using a mol-proportion of 1:5, and propyleneoxid, this product having an oH-number of 340-400, an average molecular weight of about 440 and a viscosity of about 580 mPa s/25°C, in the following example 2 called compound Y, see also "Ullmann 1963, Bd. 14, P. 50-51".

Suitable plasticizers for use in the preparation of the cartridges of the present invention include aliphatic hydrocarbons such as mineral oils and highly aromatic oil extracts, free fatty acids, tall oil, liquid distillates obtained from destructive distillation of bituminous coal, such as coal-tar oil, as well as esters of phosphoric and phthalic acids such as tricresyl phosphate and dibutyl phthalate. Castor oil is an expecially suitable plasticizer for use as plasticizer for this purpose.

The foregoing components or reactants which form the polyurethane resin furthermore possess the advantageous property that they do not foam immediately after being mixed together. The rate at which the foaming or expanding progresses can be readily controlled by the amount of water (between 0.3 and 5.0 percent by weight) that has been added to the polyetherglycol. The start of the foaming is understandably dependent upon the temperature prevailing in the rock or coal formation. By simply adjusting the water content of the polyol, however, it is possible to control the rate and the period required for completion of the foaming operation to a period between 3 and 12 minutes preferably 2-9 minutes.

In the two-compartment cartridge of the present invention the water present in the polyetherglycol may diffuse through the separating compartment wall into the compartment containing the polyisocyanate of diphenylmethane and react therewith to produce urea. In accordance with a preferred embodiment of the present invention, at least the wall separating the two compartments is made of a sheet material, for example, poly(vinylidine chloride), or a composite film consisting of, for example, superposed layers of a polyethylene resin and a polyamide resin, which are essentially impervious to water vapor.

The invention is further illustrated in the examples which follow, which were selected solely for the purposes of illustration and are not to be regarded as limiting the invention or its scope.

EXAMPLE 1

Into the wall of a bituminous coal mine, in a seam that was about to be exhausted, which wall had an area of 20 square meters, were bored to a depth of 2.50 meters, fifteen uniformly spaced holes, each having a diameter of 30 millimeters. Into each of these holes was inserted a cartridge having a length of 300 millimeters and a diameter of 22 millimeters. These cartridges had two compartments and their construction is represented in the drawings accompanying U.S. Pat. Nos. 3,698,196 and 3,705,646. The internal compartment of these cartridges contained 4,4'-bis(carbonylamino)diphenylmethane and the outer compartment contained a mixture consisting of the compound X containing 15 percent by weight of caster oil and 1 percent by weight of water. Into each hole was then thrust a wooden pole having a length of 2.00 meters in such a manner as to pierce and break open the cartridge, after which the pole was then rotated for 30 seconds at a rate of 500 revolutions per minute in order to mix thoroughly the contents of the cartridge. The pole was then removed and each of the bore holes was sealed with a plug. The thus-impregnated wall proved to be sufficiently reinforced for further unobstructed exploitation of the mine.

EXAMPLE 2

In this example two cartridges (A and B), each having a length of 300 millimeters and a diameter of 31 millimeters was formed of films of different resins and the inner compartment of each was filled with 4,4'-bis(carbonylamino)diphenylmethane while the surrounding outer compartment was filled with a mixture of compound Y containing 15 percent by weight of dibutyl phthalate and 1.5 percent by weight of water. The walls of both compartments of cartridge A were formed of a polyethylene film having a thickness of 0.05 millimeter that was used in cartridge A but the inner compartment of cartridge B was formed of a composite film having a thickness of 0.10 millimeter that was composed of a layer of a polyamid resin and a layer of a polyehtylene resin.

After storage for three months, the contents of cartridge A had solidified while the contents of cartridge B had remained unchanged.

Without further analysis, the foregoing will so fully reveal the gist of the present invention that others can, by applying current knowledge, readily adapt it for various applications without omitting features that, from the standpoint of prior art, fairly constitute essential characteristics of the generic of specific aspects of this invention.

What is claimed as new and desired to be protected by Letters Patent is set forth in the appended claims:

1. A two-compartment pierceable cartridge adapted for reinforcing a stone or coal wall by insertion into a hole that had been bored into the wall, one compartment of which contains a polyisocyanate of diphenylmethane and the other compartment of which contains a mixture of a polyetherglycol having a hydroxyl number between 200 and 400, between 10 and 20 percent by weight of a plasticizer, and between 0.3 and 5.0 percent by weight of water.

2. A two-compartment cartridge as defined in claim 1 in which the polyisocyanate of diphenylmethane is 4,4'-bis(carbonylamino)diphenylmethane.

3. A two-compartment cartridge as defined in claim 1 in which one compartment contains a mixture of 4,4'-bis(carbonylamino)diphenylmethane and at most 30 percent by weight of another polyisocyanate of an aromatic hydrocarbon.

4. A two-compartment cartridge as defined in claim 1 in which at least the wall separating the two compartments from each other is formed of a film that is essentially impervious to water vapor.

5. A two-compartment cartridge as defined in claim 1 in which the wall separating the two compartments from each other is formed of a composite film consisting of a layer of a polyethylene resin and a layer of a polyamide resin.

6. A two-compartment cartridge as defined in claim 1 in which the wall separating the two compartments from each other is formed of a poly(vinylidine chloride) resin.

7. A two-compartment cartridge as defined in claim 1 in which the polyetherglycol is the product of the reaction between trimethylolpropan and propyleneoxid, this product having an oH-number of 320–370, an average molecular weight of about 150 and a viscosity of about 700 mPa s/25°C.

8. A two-compartment cartridge as defined in claim 1 in which the polyetherglycol is the product of the reaction between sacharose and 1,2 propandiol, using a mol-proportion of 1:5, and propyleneoxid, this product having an oH-number of 340–400, an average molecular weight of about 440 and a viscosity of about 580 mPa s/25°C.

9. A two-compartment cartridge as defined in claim 1 in which the plasticizer is castor oil.

* * * * *